(12) United States Patent
De Pasquale et al.

(10) Patent No.: US 8,971,243 B2
(45) Date of Patent: Mar. 3, 2015

(54) TRANSMITTING DATA PACKETS IN MULTI-RAT NETWORKS

(75) Inventors: Andrea De Pasquale, Madrid (ES); Francisco Javier Dominguez Romero, Madrid (ES); Yannick Le Pezennec, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 921 days.

(21) Appl. No.: 12/870,203

(22) Filed: Aug. 27, 2010

(65) Prior Publication Data

US 2011/0075605 A1 Mar. 31, 2011

(30) Foreign Application Priority Data

Aug. 27, 2009 (ES) .................................. 200930632

(51) Int. Cl.
*H04W 40/00* (2009.01)
*H04W 76/02* (2009.01)
*H04B 7/02* (2006.01)

(52) U.S. Cl.
CPC ............. *H04W 76/025* (2013.01); *H04B 7/022* (2013.01)
USPC .......................................... 370/328; 455/445

(58) Field of Classification Search
USPC ................. 370/328; 455/445, 452.1
See application file for complete search history.

(56) References Cited

U.S. PATENT DOCUMENTS

| 2005/0135311 | A1 | 6/2005 | Maillard |
| 2005/0226185 | A1* | 10/2005 | Tell et al. ...................... 370/331 |
| 2008/0014957 | A1* | 1/2008 | Ore ............................ 455/452.1 |
| 2010/0034149 | A1 | 2/2010 | Lederer et al. |
| 2010/0189045 | A1* | 7/2010 | Takeshita et al. ............. 370/329 |
| 2010/0248643 | A1* | 9/2010 | Aaron et al. .................... 455/68 |
| 2012/0071168 | A1* | 3/2012 | Tomici et al. ................. 455/445 |

FOREIGN PATENT DOCUMENTS

WO WO-2008008145 1/2008

OTHER PUBLICATIONS

Luo et al, "Investigation of radio resource scheduling in WLANS coupled with 3G Cellular Network" Jun. 1, 2003, pp. 108-115, vol. 41, No. 6, IEEE Communications Magazine, IEEE Service Center, Piscataway, US.

(Continued)

*Primary Examiner* — Donald Mills
*Assistant Examiner* — Henry Baron
(74) *Attorney, Agent, or Firm* — B. Aaron Schulman, Esq.; Stites & Harbison, PLLC

(57) ABSTRACT

In order to transmit data packets in multi-RAT networks, a method and a system of network controllers are proposed comprising:
simultaneous establishment of radio connections over multiple different Radio Access Technologies or RATs, with a User Equipment or UE 13, being one radio connection firstly established over one primary RAT under a single PDP context and one or more radio connections established over at least one secondary RAT, different from the primary RAT, and under the same single PDP context;
simultaneous transmission of data packets over the different RATs towards the UE 13 and combination of the transmitted data by higher layer protocols at the UE 13.
In the present method/system, a connection is established for user plane transmission on the same PDP context between a primary network controller 11 of the primary RAT and the secondary network controller 12 of a secondary RAT. More than one secondary RAT may be involved.

35 Claims, 6 Drawing Sheets

(56) References Cited

OTHER PUBLICATIONS

Johnsson et al, "Ambient Networks—A Framework for Multi-Access Control in Heterogeneous Networks", Sep. 1, 2006, pp. 1-5, 2006 IEEE 64th Vehicular Technology Conference; VTC 2006-Fall; 25-28, Montreal, Quebec, Canada, Piscataway, NJ; IEEE Operations Center.
H3G: "Multiplexing of different Media Components within a single PDP context", 3GPP Draft; N3-020222, 3rd Generation Partnership Project (3GPP), Mobile Competence Centre; 650, Route Des Lucioles; F006921 Sophia-Antipolis Cedex; France, vol. CN WG3, No. Fort Lauderdale, USA; Apr. 17, 2002.
Magnusson et al, "Multi-radio resource management for communication networks beyond 3G", Sep. 25, 2005, pp. 1653-1657, vol. 3, Vehicular Technology Conference, 2005 VTC-2005-Fall. 2005 IEEE 62nd Dallas, TX USA Sep. 25-28, 2005, Piscataway, NJ USA, IEEE.

* cited by examiner

TRANSMITTING DATA PACKETS IN MULTI-RAT NETWORKS

TECHNICAL FIELD OF THE INVENTION

The present invention relates to broadband wireless communications systems (2G, 3G and beyond 3G networks) supporting multiple radio access technologies (RATs).

BACKGROUND OF THE INVENTION

Radio Access Technology (RAT) indicates the type of radio technology to access the Core Network (CN). Examples of RAT are the UTRA (UMTS Terrestrial Radio Access), e-UTRA (evolved UTRA also called Long Term Evolution), CDMA2000®, DECT (Digital Enhanced Cordless Technology), GERAN (GSM EDGE Radio Access Network), etc.

The different radio access technologies (RATs) are designed to fulfil specific requirements and characteristics in terms of throughput, data rate, range, mobility etc. Nowadays, third generation (3G) mobile communication systems based on a WCDMA (Wideband Code Division Multiple Access) RAT is being deployed all over the world. Furthermore, new RATs are being considered for evolved-3G (LTE) and other so-called fourth generation (4G) wireless telecommunication systems. The amount of RATs able to work in different frequency bands is increasing and being standardized.

One key capability of RATs such as 3G and LTE is that they can provide truly mobile broadband, i.e. the combination of high capacity, full mobility and coverage for the provision of data services.

New RATs or the evolution of those RATs are mainly focused on increasing the capability of the users to receive more and more data (increasing mobile broadband capabilities).

There are multi-RAT capable User Equipments (UEs) which perform searches (at switch on or following recovery from lack of coverage), for a registered or equivalent Public Land Mobile Network (PLMN) using all RATs that the UE supports, one RAT after another. All frequencies in all bands belonging to each RAT are searched, signal strength measured in order to connect the UE to a suitable cell(s) in a suitable PLMN(s) Cell/PLMN selection is usually based on the signal strength, i.e., signal to interference ratio (SIR) or signal to noise ratio (SNR), of candidate cells.

However, the achievable user throughput is limited by the amount of spectrum allocated to one specific RAT technology as well as by the current traffic experienced over that technology on a determined moment in time. This is due to the fact that the current system architectures keep focusing in establishing a connection for a single UE over a single RAT at the time.

In spite of spare capacity can be available on a RAT technology (spectrum) different from the single one currently used, there is currently no means to aggregate data from different RATs and their radio spectra cannot be used as a boost for data connection. Since just only one single RAT at the time can be used, the existing approaches to reach higher throughput are either providing higher amount of spectrum over the used RAT (2G, 3G or LTE), either the load on a specific carrier has to be decreased.

SUMMARY OF THE INVENTION

The invention relates to a method for transmitting data packets in a wireless telecommunication network according to claim 1, to a system according to claim 11 and to a network controller according to claim 13. Preferred embodiments of the system and of the method are defined in the dependent claims.

The present invention serves to solve the aforesaid problem by providing means for signalling and transport of the different data streams to be aggregated over several Radio Access Technologies (RATs) at the same time, carrying the data in the same radio spectrum or using different spectra for the different RATs. The data connection is established over a single RAT (primary RAT), preferably, 3G WCDMA, as data connection establishment is normally carried out on current networks, but the invention allows packets of data belonging to the same Packet Data Protocol (PDP) context to be sent over different RATs (secondary RATs). The proposed solution is opposed to any macro-diversity combining principle, in which the same data are sent over the same RAT and combined at the User Equipment (UE). The invention specifies system architecture and the needed call set-up flow which make possible to handle data of a single PDP context over multiple RATs and its combination at the UE. By doing so, the user throughput can be boosted far beyond the capabilities of one single specific Radio Access Technology.

The radio entity (a Radio Network Controller: RNC) in charge of the primary RAT (primary RNC) is capable of establishing additional radio connections over different RATs and relaying over these secondary RATs at least part of the data streams to be carried. The primary RNC or RAT controller is also in charge of establishing and maintaining the PDP context connection with the packet Core Network (CN) of the immediately higher Non Access Stratum (NAS) entity, e.g. by talking to the Serving GPRS Support Node (SGSN) in 2G and 3G for PDP context management. In addition, this primary RNC communicates with one or more RAT controllers (secondary controllers) in charge of managing the transport of the selected data streams over the secondary RATs.

Said communication between the primary RNC and the secondary RAT controllers can be carried out on Iur-like interfaces. These interfaces can be either external, either internal. The following scenarios are cases where the interface is internal:

In case a single RNC/BSC controller exists, communication between BSC and RNC is done internally in the node.

In a flat 3G Radio Access Network architecture (the RNC is integrated into the NodeB so that the base station can communicate directly with the Gateway GPRS Support Node—GGSN—), there is the possibility of having a Single Baseband at Base Station level (a base station supporting 3G and LTE technologies; i.e., NodeB and eNodeB are implemented at the same node). In such as scenario the communication between the primary and the secondary RAT controllers is performed internally in the same controller.

The primary RAT Controller ensures that a data flow is established over at least a secondary RAT, different from the primary RAT, using appropriate signalling flow with the User Equipment (UE), which is able to receive/send data from different RATs (and possibly different frequencies) at the same time. Thus, the primary RAT Controller routes the data stream associated to the same PDP context by mapping it into multiple streams of data (e.g., one stream per RAT) which are then combined in the UE.

When a call for a UE is set-up, the primary RAT Controller (e.g., a 3G RNC) to which the UE has a connection established through the Radio Access Network (RAN) via the primary RAT (e.g., a HSPA data connection), can decide to off-load part of the call data into other (secondary) RATs (e.g., LTE and/or GPRS/EDGE/EDGE+). This decision is based on the Radio Access Bearer (RAB) request parameters received by the primary RAT Controller (the RAB request parameters include traffic class, maximum bit rate and a forecast of the average throughput) as well as on the traffic load in the other RATs. This primary RAT Controller sends all or some packets for the call progress towards the UE by using the established interfaces with the secondary RATs (e.g., with 2G BSCs and LTE eNodeBs).

Once a multiRAT transmission/reception has been established, the UE mobility is handled independently by the different involved RATs, as if Multi-RAT transmission were not used.

When the established interface between the primary and secondary controllers cannot be used any longer for carrying secondary data flow, then a new interface between the involved controllers must be established before the a handover procedure is executed; the handover switches the call from one of the controllers into another one currently providing the UE with proper service coverage.

An aspect of the invention refers to a method for transmitting data packets over multiple Radio Access Technologies in wide area mobile networks comprising the following steps:

i) Establishing several radio connections with a multi-RAT capable User Equipment (UE) over a plurality of Radio Access Technologies (RATs) simultaneously. A radio connection is firstly established over one primary RAT activating a single PDP context. Then one or more radio connections are established under the same PDP context over one or more secondary RATs. The secondary RAT is different from the primary one and can use the same or different radio spectra. The radio connection over the secondary RAT can be established if a suitable cell is found with radio signal quality exceeding a minimum quality threshold.

ii) Transmitting the data packets over the different RATs simultaneously. When establishing the radio connection over the at least one secondary RAT, a connection for user plane transmission of data packets under the same PDP context is established between a primary network controller of the primary RAT and at least one secondary network controller of a secondary RAT. The primary RAT controller commands each secondary RAT controller to establish the radio connections with the UE. This primary RAT controller splits the data packet flow corresponding to the same PDP context into a primary data packet flow to be transmitted over the primary RAT and at least one secondary data packet flow to be transmitted over the at least one secondary RAT. The secondary data packet flow is routed through the connection between the primary and the secondary network controllers and then relayed over the secondary RAT, via radio connection between the secondary network controller and the UE. The primary data packet flow is transmitted over the primary RAT through the radio connection between the primary network controller and said UE.

iii) Combining all the data packets transmitted through a single PDP context towards the UE by higher layer protocols at said UE. All the data packets from the primary and secondary data packet flows are combined after demodulation so that the higher layer protocols can perform the relevant operations in order to reconstruct the initial data packet flow of the multi-RAT call to the UE.

Additionally, this method comprises sending to the UE a request for performing radio measurements on cells belonging to at least one secondary RAT which are able to provide relevant service coverage to said UE. These radio measurements can include parameters such as radio signal quality and load of the cell. If there is at least one cell of a secondary RAT with a measured radio signal quality which exceeds a minimum quality threshold and at the same its measured load is below a maximum load threshold, the radio connection over this secondary RAT, different from the primary RAT, can be established.

Another aspect of the invention deals with a system which comprises the primary RAT controller, at least one secondary RAT controller and the connection means establishing a communication interface between a pair of primary RAT and secondary RAT controllers, and performs the method described before. The primary RAT controller of the system is a network controller (2G BSC, 3G RNC or LTE eNodeB) which comprises radio connection means over a primary Radio Access Technology with a multi-RAT call capable UE. Each secondary RAT controller of the system is a network controller different from the primary one (2G BSC, 3G RNC or LTE eNodeB) comprising radio connection means over a secondary Radio Access Technology with the same UE. Also, the system comprises connection means between the primary network controller and the at least one secondary network controller.

Another aspect of the invention deals with a network controller (2G BSC, 3G RNC or LTE eNodeB) which is the primary network controller, in charge of the primary RAT, in the above defined system.

The primary RAT controller is configured for:
  sending by the radio connection means to the User Equipment a request for retrieving radio measurements on cells able to provide coverage to the User Equipment over the secondary Radio Access Technology;
  comparing the radio measurements with a coverage quality threshold;
  retrieving load measurements on the cells whose radio measurements are higher than the coverage quality threshold;
  comparing the load measurements with a load threshold and, if load measurements on the cells of a secondary Radio Access Technology with radio measurements higher than the coverage quality threshold are lower than the load threshold:
    commanding the User Equipment by the radio connection means to activate multi-RAT call in a selected cell, band and frequency of the secondary Radio Access Technology;
    commanding by the connection means to the at least one secondary network controller to establish a radio connection between the at least one secondary network controller and the User Equipment;
    splitting the data packet flow associated to the call into a primary data packet flow to be transmitted through the radio connection means of the primary network controller and at least one secondary data packet flow to be transmitted through the radio connection of the at least one secondary network controller;
    transmitting the at least one secondary data packet flow through the connection means from the primary network controller to the at least one secondary network controller;
  otherwise, transmitting the whole data packet flow of the call by the radio connection means of the primary network controller with the User Equipment.

A last aspect of the invention deals with a computer program comprising program code means which execute the method described before, when loaded into processing means of a network controller (primary RAT controller).

The invention works on both downlink (receiving and combining data packets at the UE) and uplink (transmitting data packets from the UE through any of the established radio connections over any of the supported Radio Access Technologies which are selected by the primary RAT controller in accordance to the radio measurements performed by the UE).

A major advantage of present invention is the achievement of higher user plane throughput whilst maximizing the available traffic capacity over different Radio Access technologies/frequency bands.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
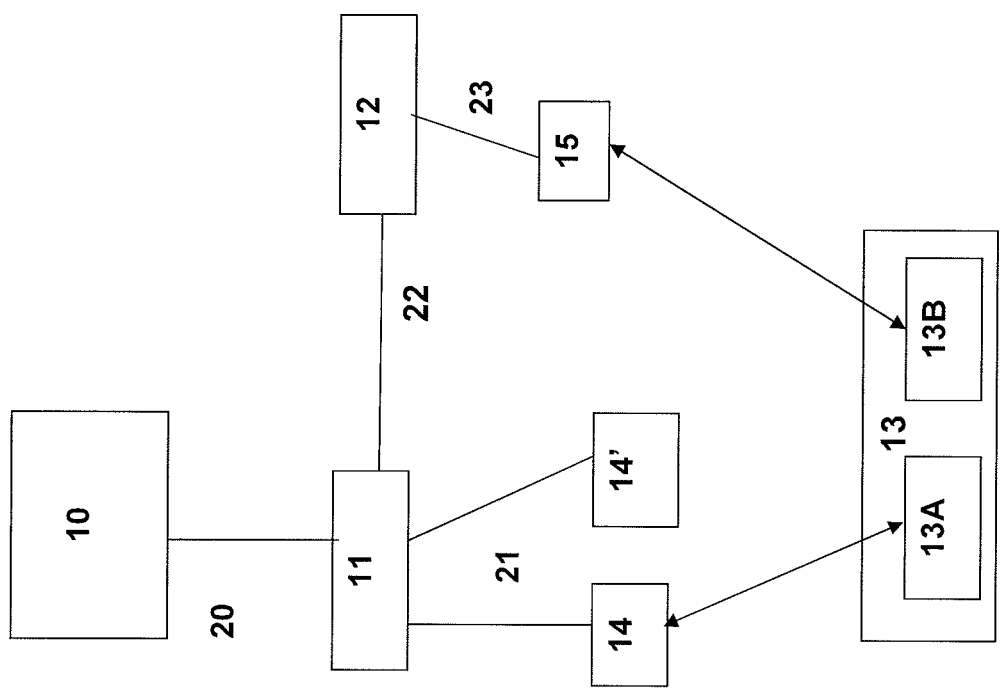
FIG. 1.—It shows block architecture of a system for transmitting data streams over multiple Radio Access Technologies, according to a preferred embodiment of the invention.

FIG. 1 shows a network architecture which is 3GPP compliant and implements the throughput boost via multi-RAT parallel data flows proposed here. The network comprises a core network 10 connected through a core packet switching interface 20, e.g., IuPS specified by 3GPP or Gb interface of 2G GPRS or S1 interface in LTE, to a primary network controller 11 which is, in a preferred example, a 3G RNC. The core network 10 serves as gateway to internet, connecting the RNC to a SGSN/GGSN, performs session and paging control, and is in charge of NAS signalling. The primary network controller 11 performs Radio Resource Control signalling, Radio Resource Management and Mobility Management and the functions of Radio Link Control, in order to set up the PDP context connection with the Core Network 10. The network further comprises at least one secondary network controller 12 which has the same functionalities as the primary controller 11 aforementioned and connects with the Core Network 10 through said primary controller 11, using a Iur-like interface 22 defined for signalling and user plane of the, internal or external, communication between the pair of primary 11 and secondary controllers 12. Each primary 11 and secondary 12 controller manages one or more base station, 14, 14', 15, with their respective radio access technology, via the corresponding standardized interface 21, 23; e.g., Abis if the base station is 2G BTS controlled by a BSC acting as primary or secondary controller, Iub for NodeB controlled by 3G RNC or the internal interface of eNodeB in LTE.

For example, the network entities shown in FIG. 1 can be, depending on the supported radio access technologies:
the controllers 11 and 12 respectively of primary and secondary radio access technologies: the BSC in 2G, the RNC in 3G and the eNodeB in LTE;
the base stations 14, 14', 15 respectively of primary and secondary radio access technologies: the BTS in 2G RAN, the NodeB in 3G FDD or TDD UTRAN, the eNodeB in FDD or TDD LTE system.

The primary controller 11 is connected to each secondary controller 12 via the interface 22 that carries signalling to establish and control the Multi-RAT call, as well as provides the User Plane data for the secondary flow established trough the secondary RAT.

The other interfaces, respectively with the Core Network 10 and the User Equipment (UE) 13, are the standard interfaces defined in the 2G or 3G or LTE architecture.

The UE 13 is a user terminal with simultaneous multi-RAT capability, provided with a primary RAT receiver/transmitter 13A and at least one secondary RAT receiver/transmitter 13B.

Figure 2:
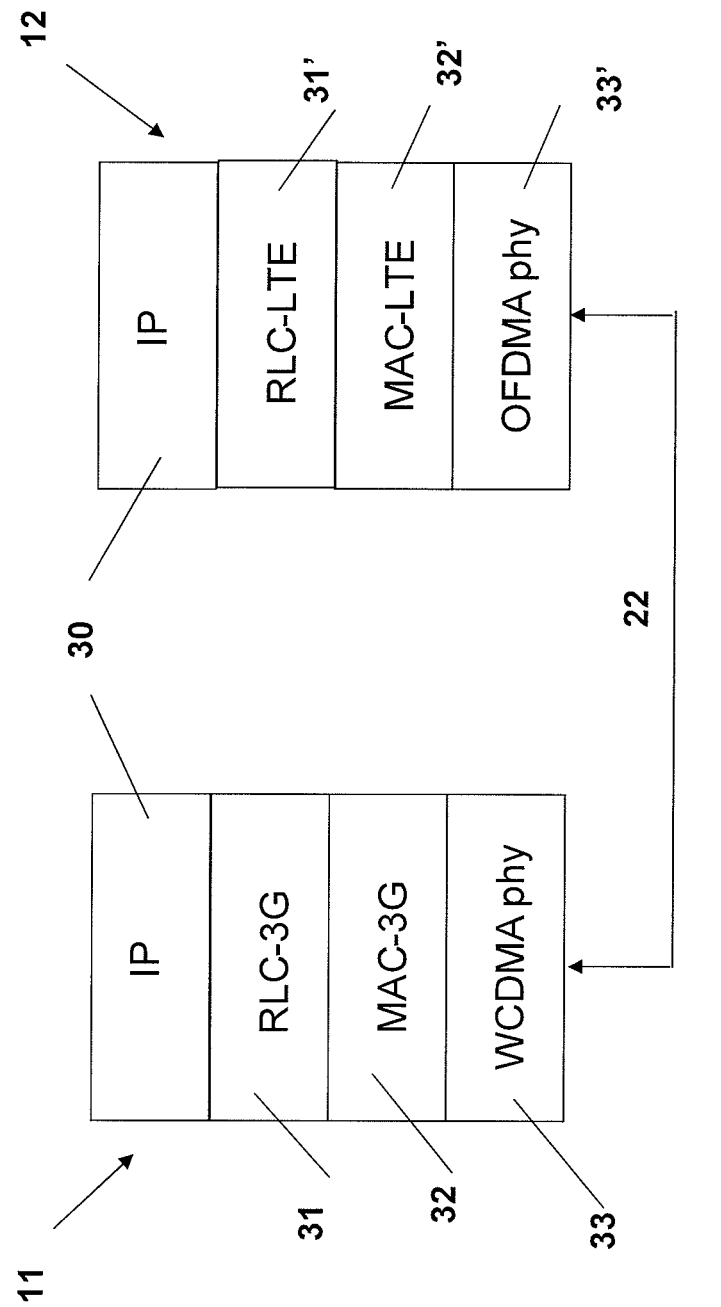
FIG. 2.—It shows a protocol stack representation of the network entities involved in the system for transmitting data streams over multiple Radio Access Technologies, according to a possible embodiment of the invention.

FIG. 2 shows a possible implementation of the protocol stacks in the primary and secondary controllers 11, 12 for data routing in a network scenario where the primary RAT managed by the primary controller 11 is 3G WCDMA, the secondary RAT provided by the secondary controller 12 is LTE and all the RAN nodes receive IP packets from the SGSN/GGSN of the Core Network 10. In this example, these primary and secondary controllers 11, 12 have a common protocol layer 30 which is IP layer, so that the incoming IP packets from the Core Network 10 are sent by the primary controller 11, i.e., the RNC, to the NodeB via Iub interface and, through the interface 22, sent to the secondary controller 12 towards the eNodeB. The amount of packets to be sent towards the WCDMA physical layer 33 of the primary RAT or the OFDMA physical layer (33') of the secondary RAT, through the RLC-3G/MAC-3G and RLC-LTE/MAC-LTE layers 31, 32, 31', 32' respectively, is dynamically adjusted by the RNC, for example, according to the flow control information feedback received through the RNC-eNodeB interface. Whenever erroneous packets remain after RLC retransmission, which is infrequent, those packets are handled by the above application layers, usually triggering TCP retransmissions. Packet Data Convergence Protocol—PDCP—can be used to compress the IP headers by the primary controller (11). As an example, in the case of using 3G as primary RAT and LTE as secondary RAT, it is necessary to perform IP headers compression in the primary RAT by the RNC, because this functionality in LTE is included in Core Network Nodes but not in the eNodeB. Thus, the RNC as primary controller 11 acts as a router that receives the IP flow through IuPS interface and relays the IP packets splitting the data flow into to the RLC-3G and the RLC-LTE to be sent to the NodeB and the eNodeB. Therefore, in this case, data combination is carried out above the RLC layers.

Figure 3:
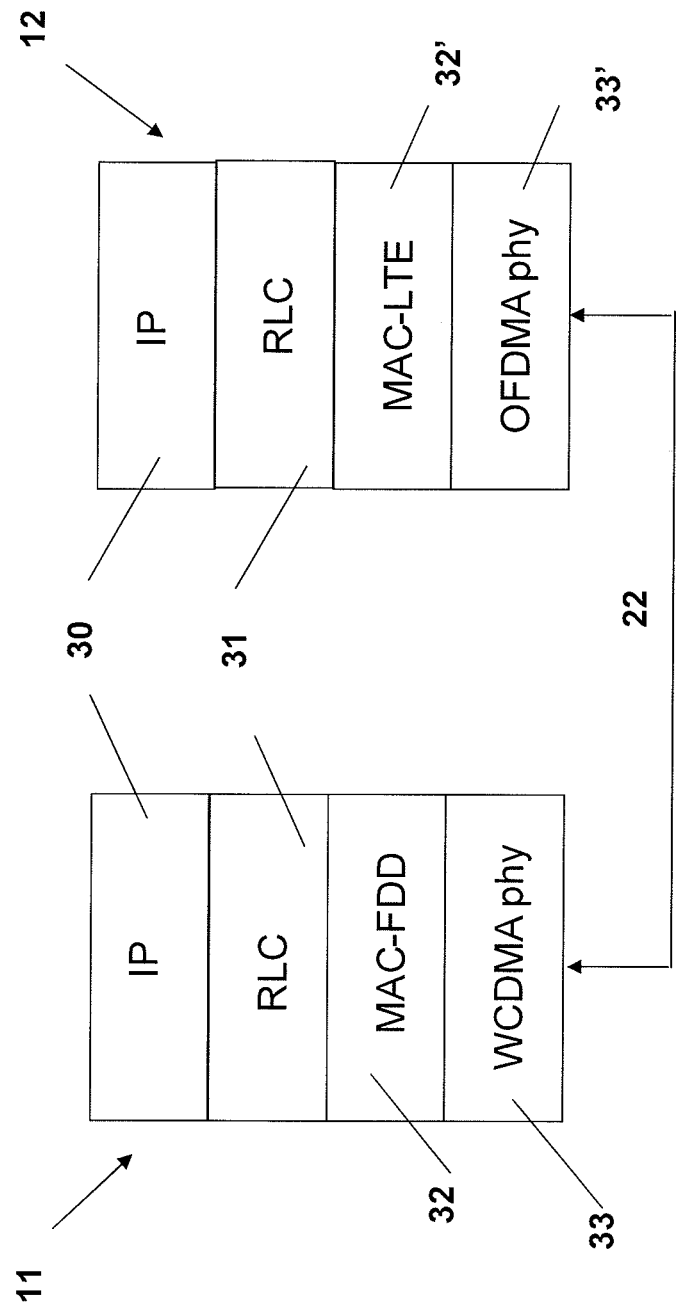
FIG. 3.—It shows a protocol stack representation of the network entities involved in the system for transmitting data streams over multiple Radio Access Technologies, according to another possible embodiment of the invention.

Another possible implementation consists of combining the data from IP packets of the same PDP context below the RLC level, as performed by the protocol stacks shown in FIG. 3. The preferred primary RAT is 3G WCDMA and the secondary RAT is LTE. The RNC is the controller node provided with IP layer as common protocol layer 30 between the entities of primary and secondary controllers 11, 12 and a common protocol for the radio part 31 which is the RLC 3G layer.

Figure 4:
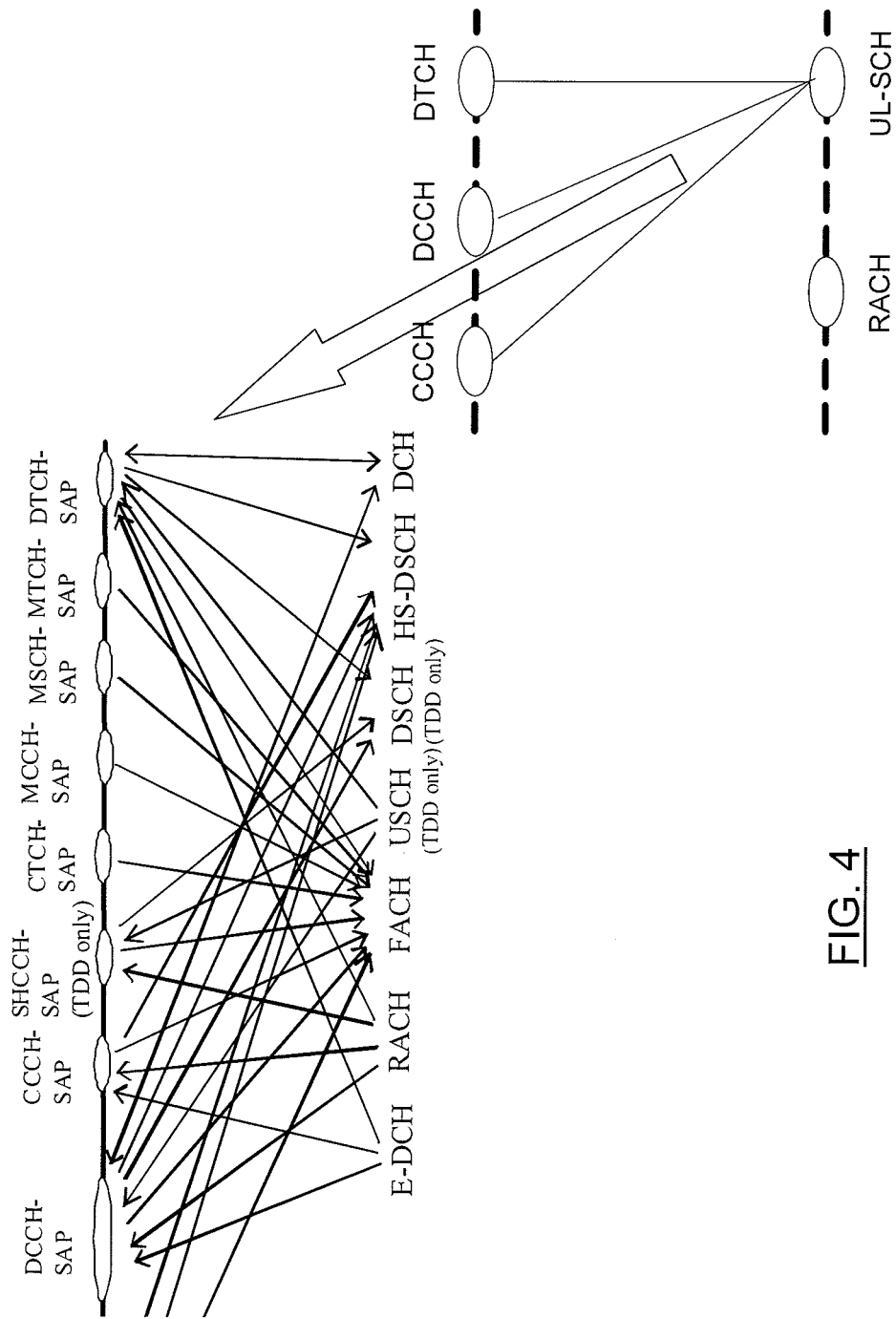
FIG. 4.—It shows a schematic representation of channel mapping between Radio Access Technologies in uplink, according to a possible implementation.
Figure 5:
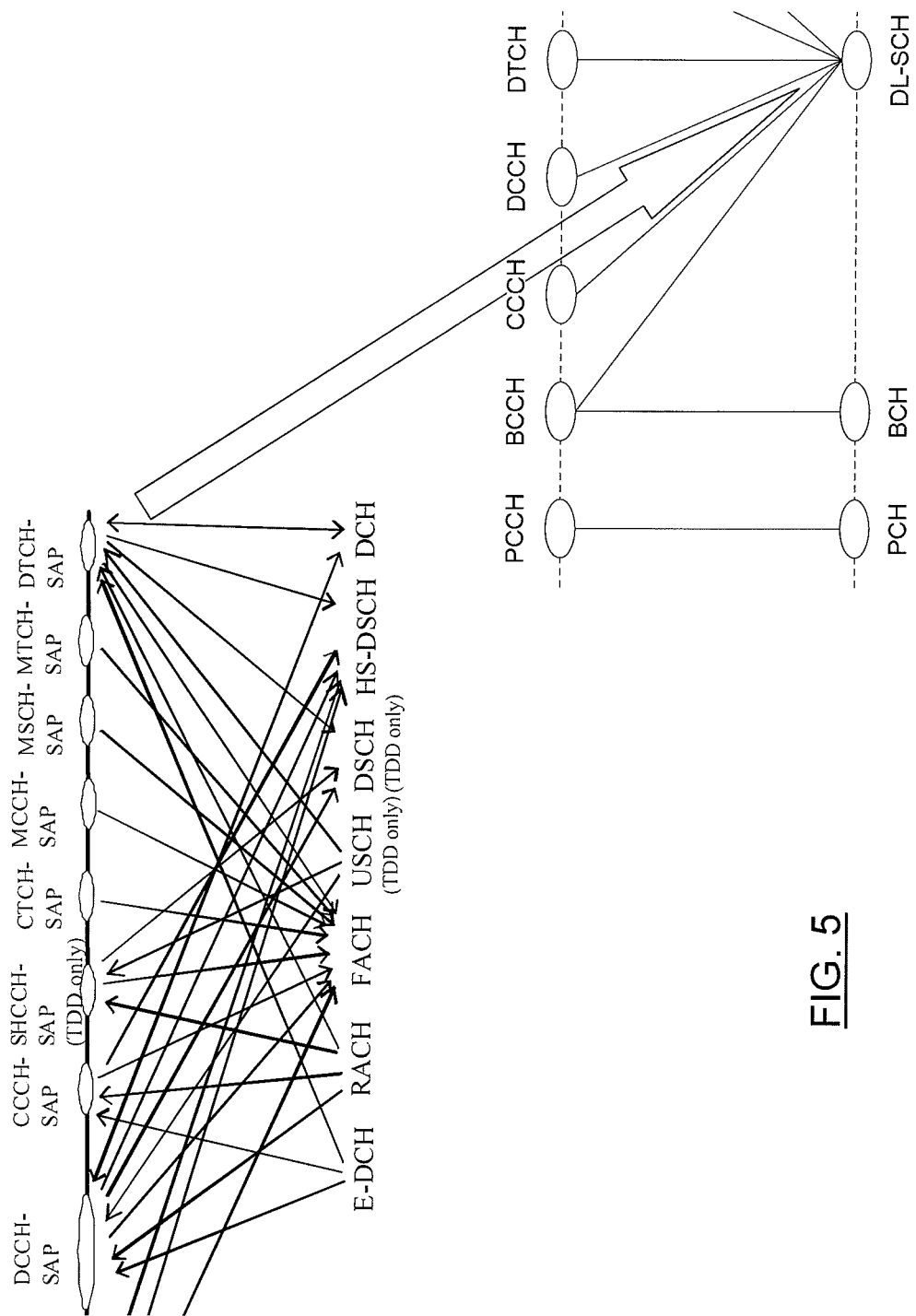
FIG. 5.—It shows a schematic representation of channel mapping between Radio Access Technologies in downlink, according to a possible implementation.

In this case, the RNC playing the role of primary controller 11 routes but also combines itself the data received from the Core Network 10. The RNC is transmitting normally some of the 3G-RLC PDUs and other data stream of PDUs is then routed to the eNodeB, which encapsulates the 3G-RLC PDUs over MAC-LTE layer. Then the UE 13 takes all the 3G-RLC PDUs as they are numbered and performs reordering in order to rebuild the packets from the two different RATs used for data routing into the original IP packet data stream. Basically, in this preferred implementation, the RNC maps the RLC 3G channels into the Transport Channels of LTE: In uplink, as shown in FIG. 4, the Uplink Shared Channel (UL-SCH) in LTE defined by 36.300 Technical Specification of the 3GPP standards can be mapped into the uplink 3G logical channel which carries Dedicated Traffic Channel (DTCH). FIG. 5 shows mapping in downlink, the Dedicated Traffic Channel (DTCH) of 3G maps onto Downlink Shared Channel (DL-SCH) used as transport channel in LTE.

Figure 6:
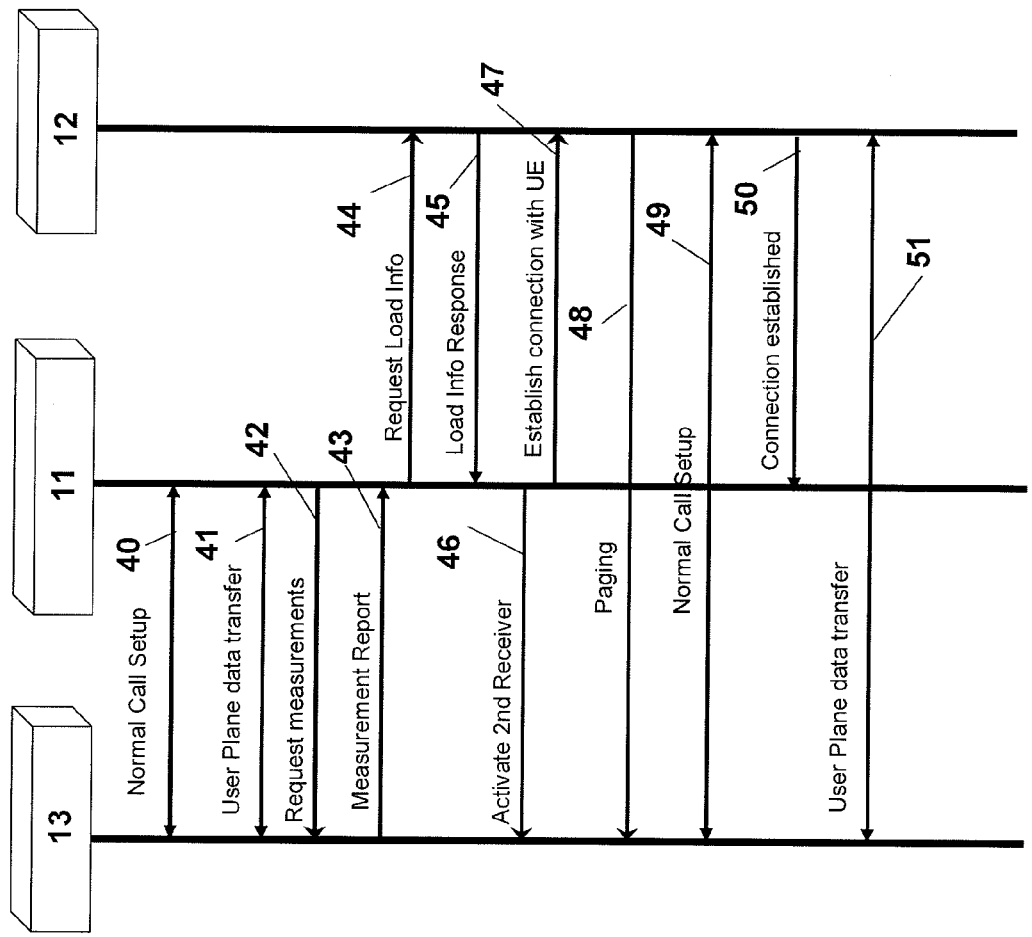
FIG. 6.—It shows a message flow diagram of the method for transmitting data streams over multiple Radio Access Technologies, according to a preferred embodiment of the invention.

FIG. 6 shows a diagram of the messages interchanged by the network entities in the call set-up signalling process for the proposed multi-RAT transmission.

1) Call setup 40 and user plane transfer 41 are normally carried out between the primary network controller 11 and the UE 13. During the RRC connection setup complete of the normal call set-up 40, the UE 13 sends a signalling message with a 3GPP UE capabilities field which includes new Information Element (IE) indicating the UE ability to support a dual-RAT call or multi-mode in general and indicating frequency bands which multi-RAT transmitting/receiving is carried over.
2) Establishment of the call, or call setup 40, over a primary RAT is processed as usual, including PDP context establishment, Authentication and the normal procedures executed by the Core Network 10 Nodes that are connected to the primary controller 11. The primary controller 11, RNC in the 3G case, also intervenes normally in all the procedures for call setup 40, including the ciphering, over its primary RAT.
3) The primary controller 11 seeks info on the cells belonging to other RATs that are capable to provide coverage to the UE 13. This is achieved by using a standard 3GPP measurement control command 42 for requesting the UE 13 to perform radio measurements over the cells of the different RATs which are neighbour cells of the one currently providing service to this UE 13. The UE 13 takes radio signal measurements of neighbouring cells and compares these cell measures to each other and to the radio signal of the current cell in order to determine which cell provides the best signal strength/quality. Typical radio measurements can include: in 3G, the energy per chip (Ec) and the spectral noise power density (No) received by the UE 13 to determine the ratio Ec/No, also RSSI or path loss may be measured; in 2G, the UE 13 measures the received signal strength (Rx-Lev).
4) The primary controller 11 retrieves info on the available load 44 in the different-RAT cells whose coverage quality is higher than a minimum quality threshold. The information retrieval implies contacting via a set of interfaces the secondary controllers 12, e.g., the eNodeBs in the case of LTE and the BSCs in the case of 2G/EDGE, under which the cells with relevant coverage to the UE are handled.
5) The primary controller 11 decides, based on the received measurement report 43 from the UE 13 and the load info response 45 from each secondary controller 12, whether a second—or third . . . —data flow has to be established in basis of all the received info.
6) If the primary controller 11 decides to use a secondary or more RATs, the UE 13 is notified to activate the second receiver 46, or the needed receivers, over a specific band, frequency and cell.
7) At the same time, the primary controller 11 sends a request to the selected secondary controllers 12 to establish a connection 47 between them for user plane transmission to a specific UE 13, as well as to send a paging 48 to the paging group which the selected UE 13 belongs to.
8) Each secondary controller 12 sends a paging to the UE 13, the UE 13 answers as per a normal call setup procedure 49 defined on the RAT used by the secondary controller 12, and a Radio connection is finally established 50 between the UE 13 and each secondary controller 12 selected to carry part of the data flow. Transfer of user plane data 51 comes to pass normally between the UE 13 and each secondary controller 12. The UE 13 receives the information of the channel setup and, as for example of FIG. 3, this info is directly mapped to the same layer that receives the RLC PDUs in the primary controller 11. Also, every secondary controller 12 executes its ciphering procedure. Once completed, the secondary controller 12 signals that it is ready to receive data to the primary controller 11.
9) The primary controller 11 starts routing some of the packets received from the core network 10, by SGSN/GGSN, to each secondary controller 12 which connection is established to, via the established interface between them.
10) The packets are combined by the UE 13 once received.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for transmitting data packets in a wireless telecommunication network having a common core network and supporting multiple Radio Access Technologies, the method comprising:
   establishing simultaneous radio connections over a plurality of different Radio Access Technologies between a User Equipment and the common core network;
   transmitting data over the different Radio Access Technologies simultaneously between the User Equipment and the common core network; and
   combining all the transmitted data through a single PDP context at the same User Equipment, and
   wherein establishing the simultaneous radio connections comprises firstly establishing the single PDP context and a first radio connection over a primary Radio Access Technology, sending to the User Equipment a request for performing radio measurements on cells which are able to provide relevant service coverage over one or more secondary Radio Access Technologies that are different from the primary Radio Access Technology to the User Equipment, and establishing a corresponding second radio connection over each of at least one of the one or more secondary Radio Access Technologies and under the same PDP context as the first radio connection, and wherein the corresponding second radio connection over each secondary Radio Access Technology is established only if there is at least one cell for the secondary Radio Access Technology for which both a measured radio signal quality exceeds a minimum quality threshold and a measured load is below a maximum load threshold.

2. The method according to claim 1, wherein establishing the corresponding second radio connection over each of the at least one of the one or more secondary Radio Access Technologies comprises:

commanding, via a primary network controller for the primary Radio Access Technology, the User Equipment to activate a multi-RAT call with an initial data packet flow in a selected cell, band and frequency of the secondary Radio Access Technology using the same PDP context; and commanding, via the primary network controller, a secondary network controller for the secondary Radio Access Technology to establish the corresponding second radio connection between the secondary network controller and the User Equipment, and wherein each secondary network controller, upon being commanded to establish the corresponding second radio connection over the secondary Radio Access Technology of the secondary network controller, sends a paging to the User Equipment for initiate a call setup procedure to establish the corresponding second radio connection between the secondary network controller and the User Equipment.

3. The method according to claim 2, further comprising:
establishing a connection for user plane transmission of data packets under the same PDP context between the primary network controller and the secondary network controller for each of the at least one of the one or more secondary Radio Access Technologies;

splitting the initial data packet flow into a primary data packet flow to be transmitted over the primary Radio Access Technology and a corresponding secondary data packet flow to be transmitted over each of the at least one of the one or more secondary Radio Access Technologies; and commanding the User Equipment to combine all data packets from the primary and the corresponding secondary data packet flow transmitted over each of the at least one of the one or more secondary Radio Access Technologies to reconstruct the initial data packet flow.

4. The method according to claim 3, further comprising, after splitting the initial data packet flow, routing the corresponding secondary data packet flow to be transmitted over each of the at least one of the one or more secondary Radio Access Technologies through the connection between the primary network controller and the secondary network controller for the secondary Radio Access Technology.

5. The method according to claim 4, further comprising transmitting the primary data packet flow through the first radio connection between the primary network controller and the User Equipment and the corresponding secondary data packet flow to be transmitted over each of the at least one of the one or more secondary Radio Access Technologies through the corresponding second radio connection between the secondary network controller for the secondary Radio Access Technology and the User Equipment.

6. The method according to claim 1, further comprising transmitting data packets from the User Equipment on an uplink through any of the established radio connections over any of the plurality of different Radio Access Technologies.

7. A system for transmitting data packets in a wireless telecommunication network having a common core network and supporting multiple Radio Access Technologies, comprising:

a primary network controller comprising first radio connection means over a primary Radio Access Technology with a multi-RAT call capable User Equipment which supports the primary Radio Access Technology and at least one secondary Radio Access Technology different from the primary Radio. Access Technology;

for each of the at least one secondary Radio Access Technology, a secondary network controller comprising corresponding second radio connection means over the secondary Radio Access Technology with the User Equipment; and connection means between the primary network controller and each secondary network controller for the at least one secondary Radio Access Technology;

and wherein the primary network controller is configured to:

send, by the first radio connection means to the User Equipment, a request for retrieving radio measurements on cells able to provide coverage to the User Equipment over the at least one secondary Radio Access Technology;

comparing the radio measurements with a coverage quality threshold;

retrieving load measurements on the cells whose radio measurements are higher than the coverage quality threshold;

comparing the load measurements with a load threshold and, if load measurements on at least one cell of a secondary Radio Access Technology with radio measurements higher than the coverage quality threshold are lower than the load threshold:

commanding the User Equipment by the first radio connection means to activate a multi-RAT call with an initial data packet flow in a selected cell, band and frequency of the secondary Radio Access Technology;

commanding by the connection means to the secondary network controller for the secondary Radio Access Technology to establish a corresponding second radio connection between the secondary network controller and the User Equipment;

splitting the initial data packet flow into a primary data packet flow to be transmitted through the first radio connection means of the primary network controller and a secondary data packet flow to be transmitted through the corresponding second radio connection of the secondary network controller for the secondary Radio Access Technology; and transmitting the secondary data packet flow for the secondary Radio Access Technology through the connection means from the primary network controller to the secondary network controller for the secondary Radio Access Technology; and otherwise, transmitting the entire initial data packet flow by the first radio connection means of the primary network controller with the User Equipment.

8. The system according to claim 7 wherein the primary network controller and each secondary network controller are selected from a 2G BSC, a 3G RNC and a LTE eNodeB.

9. A network controller comprising processing means configured to implement the method defined claim 2.

10. A network controller according to claim 9 which is selected from a 2G BSC, a 3G RNC and a LTE eNodeB.

11. A non-transitory computer-readable storage medium having program code embodied thereon, the program code executable by a processor to implement a method for transmitting data packets in a wireless telecommunication network having a common core network and supporting multiple Radio Access Technologies, the method comprising:
- establishing simultaneous radio connections over a plurality of different Radio Access Technologies between a User Equipment and the common core network,
- transmitting data over the different Radio Access Technologies simultaneously between the User Equipment and the common core network,
- combining all the transmitted data through a single PDP context at the same User Equipment, and
- wherein the single PDP context and a first radio connection are firstly established over a primary Radio Access Technology and then a corresponding second radio connection is established over each of at least one secondary Radio Access Technology, different from the primary Radio Access Technology, and under the same PDP context as the first radio connection,
- wherein establishing the corresponding second radio connection over each secondary Radio Access Technology comprises:
  - commanding, via a primary network controller for the primary Radio Access Technology, the User Equipment to activate a multi-RAT call with an initial data packet flow in a selected cell, band and frequency of each secondary Radio Access Technology using the same PDP context;
  - commanding, via the primary network controller, a secondary network controller for each secondary Radio Access Technology to establish the corresponding second radio connection between the secondary network controller and the User Equipment;
- establishing a connection for user plane transmission of data packets under the same PDP context between the primary network controller and the secondary network controller for each secondary Radio Access Technology;
- splitting the initial data packet flow into a primary data packet flow to be transmitted over the primary Radio Access Technology and a corresponding secondary data packet flow to be transmitted over each secondary Radio Access Technology; and
- commanding the User Equipment to combine all data packets from the primary and the corresponding secondary data packet flow transmitted over each secondary Radio Access Technology to reconstruct the initial data packet flow, and
- wherein each secondary network controller, upon being commanded to establish the corresponding second radio connection over the secondary Radio Access Technology of the secondary network controller, sends a paging to the User Equipment for initiate a call setup procedure to establish the corresponding second radio connection between the secondary network controller and the User Equipment.

12. A method for establishing simultaneous radio connections over a plurality of different Radio Access Technologies between a User Equipment and a common core network of a wireless telecommunication network, the method comprising:
- establishing a single PDP context and a first radio connection over a primary Radio Access Technology; and
- establishing a corresponding second radio connection over each of at least one secondary Radio Access Technology, different from the primary Radio Access Technology and under the same PDP context as the first radio connection, by:
  - commanding, via a primary network controller for the primary Radio Access Technology, the User Equipment to activate a multi-RAT call with an initial data packet flow in a selected cell, band and frequency of each secondary Radio Access Technology using the same PDP context; and
  - commanding, via the primary network controller, a secondary network controller for each secondary Radio Access Technology to establish the corresponding second radio connection between the secondary network controller and the User Equipment, and
- wherein each secondary network controller, upon being commanded to establish the corresponding second radio connection over the secondary Radio Access Technology of the secondary network controller, sends a paging to the User Equipment for initiate a call setup procedure to establish the corresponding second radio connection between the secondary network controller and the User Equipment.

13. A method for transmitting data packets in a wireless telecommunication network, the wireless telecommunication network including a core network and supporting multiple Radio Access Technologies (RATs), the method comprising:
- establishing a first radio connection over a first RAT between a User Equipment and the core network and a second radio connection over a second RAT between the User Equipment and the core network;
- transmitting a first data packet flow between the User Equipment and the core network over the first RAT via the first radio connection; and
- transmitting a second data packet flow between the User Equipment and the core network over the second RAT via the second radio connection; and
- receiving data packets transmitted from the User Equipment on an uplink through any established radio connections over any of the supported Radio Access Technologies, and
- wherein the first RAT comprises a first network controller and the second RAT comprises a second network controller, wherein the first network controller is directly connected to the core network, and wherein the second network controller is connected to the core network via the first network controller.

14. The method of claim 13, further comprising relaying the second data packet flow between the first network controller and the second network controller.

15. The method of claim 13, wherein the first data packet flow and the second data packet flow comprise IP packets, and further comprising processing the first data packet flow and the second data packet flow based on a common protocol layer at the first and the second network controller.

16. The method of claim 15, wherein processing the first data packet flow and the second data packet flow based on the common protocol layer comprises combining the first data packet flow and the second data packet flow.

17. The method of claim 13, wherein the first data packet flow and the second data packet flow belong to the same Packet Data Protocol (PDP) context.

18. The method of claim 17, further comprising combining the first data packet flow and the second data packet flow at the User Equipment (UE).

19. The method of claim 17, wherein the PDP context and the first radio connection are firstly established and then the second radio connection is established.

20. The method of claim 19, wherein the second radio connection is established only if a suitable cell is found with radio signal quality exceeding a minimum quality threshold.

21. The method of claim 19, further comprising sending to the User Equipment a request for performing radio measurements on cells which are able to provide relevant service coverage over the second RAT to the User Equipment.

22. The method of claim 21, wherein the second radio connection is established only if there is at least one cell with a measured radio signal quality exceeding a minimum quality threshold and concurrently with a measured load of the at least one cell being below a maximum load threshold.

23. The method of claim 13, further comprising:
establishing a connection for user plane transmission of data packets between the first network controller and the second network controller;
commanding, by the first network controller, the User Equipment to activate a multi-RAT call with an initial data packet flow in a selected cell, band, and frequency of the second RAT; and
commanding, by the first network controller, the second network controller to establish the second radio connection.

24. The method of claim 23, further comprising:
splitting an initial data packet flow of the multi-RAT call into the first data packet flow to be transmitted over the first RAT and the secondary data packet flow to be transmitted over the second RAT; and
commanding the User Equipment to combine the first data packet flow and the second data packet flow in order to reconstruct the initial data packet flow.

25. The method of claim 23, wherein the first data packet flow and the second data packet flow belong to a same Packet Data Protocol (PDP) context.

26. The method of claim 23, further comprising routing the second data packet flow through the connection between the first network controller and the second network controller.

27. The method of claim 26, further comprising transmitting the first data packet flow between the first network controller and the User Equipment and the second data packet flow between the second network controller and the User Equipment.

28. The method of claim 13, wherein the first network controller and the second network controller are selected from a 2G BSC, a 3G RNC, and a LTE eNodeB.

29. A system for transmitting data packets in a wireless telecommunication network, the wireless telecommunication network including a core network and supporting multiple Radio Access Technologies (RATs), the system comprising:
a first controller associated with a first RAT of the multiple RATs;
a second controller associated with a second RAT of the multiple RATs;
means for establishing a first radio connection over the first RAT between a User Equipment and the core network and a second radio connection over the second RAT between the User Equipment and the core network;
means for transmitting a first data packet flow between the User Equipment and the core network over the first RAT via the first radio connection;
means for transmitting a second data packet flow between the User Equipment and the core network over the second RAT via the second radio connection; and
means for receiving data packets transmitted from the User Equipment on an uplink through any established radio connections over any of the supported Radio Access Technologies,
wherein the first controller is directly connected to the core network, and
wherein the second controller is connected to the core network via the first controller.

30. A system according to claim 29, wherein the first network controller and the second network controller are selected from a 2G BSC, a 3G RNC, and a LTE eNodeB.

31. A network controller for transmitting data packets in a wireless telecommunication network, the wireless telecommunication network including a core network and supporting multiple Radio Access Technologies (RATs), the network controller being associated with a first RAT of the multiple RATs, the network controller comprising:
means for establishing a first radio connection over the first RAT between a User Equipment and the core network;
means for establishing a relay connection for user plane transmission of data packets between the network controller and a second network controller that is associated with a second RAT of the multiple RATs;
means for transmitting a first data packet flow between the User Equipment and the core network over the first RAT via the first radio connection;
means for relaying, between the network controller and the second network controller over the relay connection, a second data packet flow that is for transmission between the User Equipment and the core network over the second RAT via a second radio connection; and
means for receiving data packets transmitted from the User Equipment on an uplink through any established radio connections over any of the supported Radio Access Technologies.

32. A network controller for transmitting data packets in a wireless telecommunication network, the wireless telecommunication network including a core network and supporting multiple Radio Access Technologies (RATs), the network controller being associated with a first RAT of the multiple RATs, the network controller comprising:
means for establishing a first radio connection over the first RAT between a User Equipment and the core network;
means for establishing a relay connection for user plane transmission of data packets between the network controller and a second network controller that is associated with a second RAT of the multiple RATs;
means for relaying, between the network controller and a second network controller over the relay connection, a first data packet flow that is for transmission over the first radio connection; and
means for receiving data packets transmitted from the User Equipment on an uplink through any established radio connections over any of the supported Radio Access Technologies, and
wherein the first data packet flow is transmitted between the core network and the network controller via the second network controller.

33. A non-transitory computer-readable storage medium having program code embodied thereon, the program code executable by a processor to implement a method for transmitting data packets in a wireless telecommunication network having a common core network and supporting multiple Radio Access Technologies, the method comprising:
establishing a first radio connection over a first RAT between a User Equipment and the core network and a second radio connection over a second RAT between the User Equipment and the core network;
transmitting a first data packet flow between the User Equipment and the core network over the first RAT via the first radio connection;

transmitting a second data packet flow between the User Equipment and the core network over the second RAT via the second radio connection; and receiving data packets transmitted from the User Equipment on an uplink through any established radio connections over any of the supported Radio Access Technologies, and wherein the first RAT comprises a first network controller and the second RAT comprises a second network controller, wherein the first network controller is directly connected to the core network, and wherein the second network controller is connected to the core network via the first network controller.

34. A method for transmitting data packets in a wireless telecommunication network, the wireless telecommunication network including a core network and supporting multiple Radio Access Technologies (RATs), the method comprising:

establishing a first radio connection over a first RAT between a User Equipment and the core network and a second radio connection over a second RAT between the User Equipment and the core network;

transmitting a first data packet flow between the User Equipment and the core network over the first RAT via the first radio connection; and transmitting a second data packet flow between the User Equipment and the core network over the second RAT via the second radio connection, wherein the first RAT comprises a first network controller and the second RAT comprises a second network controller, wherein the first network controller is directly connected to the core network, and wherein the second network controller is connected to the core network via the first network controller, and wherein the first data packet flow and the second data packet flow belong to the same Packet Data Protocol (PDP) context.

35. A method for transmitting data packets in a wireless telecommunication network, the wireless telecommunication network including a core network and supporting multiple Radio Access Technologies (RATs), the method comprising:

establishing a first radio connection over a first RAT between a User Equipment and the core network and a second radio connection over a second RAT between the User Equipment and the core network;

transmitting a first data packet flow between the User Equipment and the core network over the first RAT via the first radio connection; and transmitting a second data packet flow between the User Equipment and the core network over the second RAT via the second radio connection, wherein the first RAT comprises a first network controller and the second RAT comprises a second network controller, wherein the first network controller is directly connected to the core network, and wherein the second network controller is connected to the core network via the first network controller, and wherein the first network controller and the second network controller are selected from a 2G BSC, a 3G RNC, and a LTE eNodeB.

* * * * *